United States Patent Office 3,151,906
Patented Oct. 6, 1964

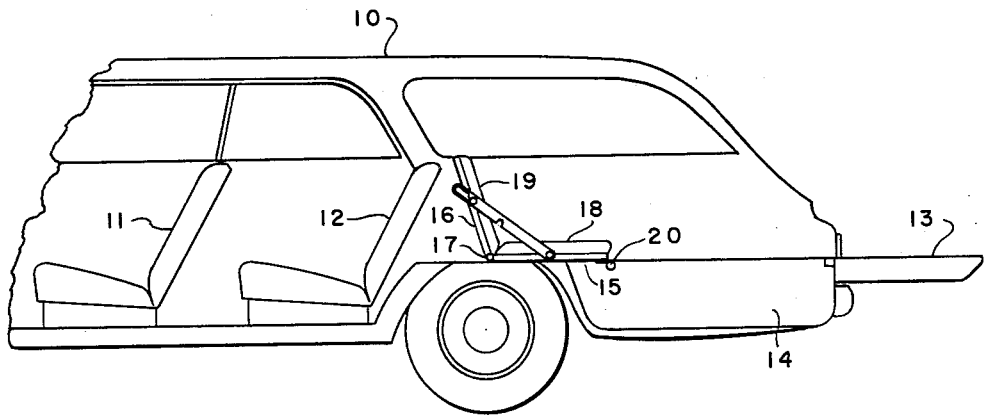
Fig. I
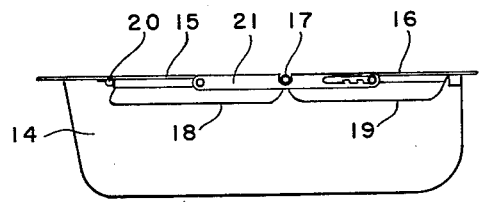
Fig. II
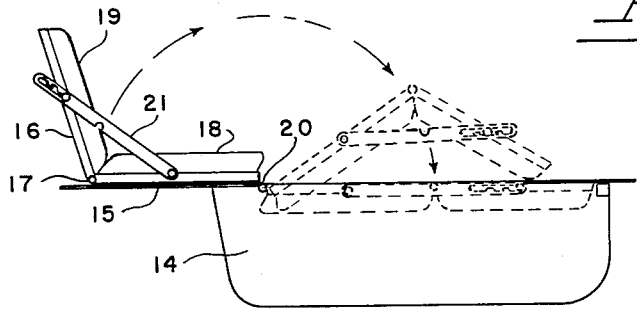
Fig. III
HERBERT B. ROBERTS INVENTOR.
BY *Herbert B. Roberts*
ATTORNEY.

3,151,906
MULTIPLE PURPOSE VEHICLE SEAT
Herbert B. Roberts, 30 Woolsey Drive,
Longmeadow, Mass.
Filed Dec. 19, 1962, Ser. No. 245,839
4 Claims. (Cl. 296—66)

This invention relates to improvements in vehicle seats and is particularly concerned with a station wagan luggage compartment lid which may be readily converted into a third seat.

As station wagons have emerged into vehicles for cross-country transportation, various changes and modifications have been made to render them more adapted for such travel. In this connection, the handling of luggage has been a major problem. Top carriers have been utilized for this purpose but obviously create wind resistance and are inaccessible in addition to exposing the luggage to the elements. Carrying luggage on the rear deck of a station wagon has not been very successful because it is difficult to keep the luggage from moving around during stops and starts of the vehicle. Several manufacturers have moved the spare tire from the customary compartment under the rear deck into one of the wheel wells in order to accommodate the third seat in nine passenger models. With all of these changes, the problem of handling luggage in station wagons has not been completely solved.

It is an object of this invention to provide a rear compartment suitable for hauling luggage with a lid which is adapted for easy and quick conversion into a third seat. Another object of this invention is to provide a rear compartment lid which is divided into at least two parts and adapted for quick and easy conversion into a seat. It is still another object of this invention to provide a third seat for station wagons which is inexpensive and easily fabricated.

This invention relates to a vehicle of the station wagon type comprising a body having a compartment located in the rear portion of the body, the compartment being closable by means of a lid which is normally in a plane with the floor of the rear deck when in a closed position, the lid being comprised of at least two sections, one section being adapted to serve as the back of a rear seat and the other being adapted to serve as the base of a rear seat.

The invention can best be understood by referring to the drawings wherein FIGURE 1 is a cross section of a station wagon showing the convertible luggage compartment lid in position for utilization as a seat; FIGURE 2 is a cross section of the luggage compartment with the convertible lid in closed position; and, FIGURE 3 shows the luggage compartment with the lid opened to function as a seat.

Referring to the drawings, the station wagon body 10 contains the customary front seat 11 and second seat 12. The customary tail gate 13 is shown in open position. The luggage compartment 14 is shown in FIGURE 1 in fixed relationship to the station wagon body. The luggage compartment lid is comprised of one rigid panel 15 and another rigid panel 16. These rigid panels are hingedly attached to each other by means of a hinge 17. Attached to the bottom of panel 15 is a cushion 18 which serves as the seat when the lid is in position to function as a seat. Attached to the panel 16 is a cushion 19 which functions as the back of the seat when the lid is in position to function as a seat. The forwardmost edge of the rigid panel 15 is hingedly attached at 20 to form the pivot for opening the compartment lid or for converting the lid into a third seat. The rearwardmost portion of the rigid panel 16 may contain any of the well known and customary latching devices.

The rigid panels 15 and 16 are normally in a plane with the rear deck when in closed position to form a lid for the luggage compartment and will normally be made from any well known rigid material such as steel, aluminum, rigid plastics, etc. In order to minimize the structural requirements of the rigid panels 15 and 16 it may be desirable to provide projections along each side of the station wagon body at least at the point where the two sections are hinged together.

The two sections of the compartment lid of this invention may be readily converted into a third seat by reversing the lid, e.g., by flipping it over, so that the under sides of the two sections are exposed to form the cushion and the back of the third seat.

The two sections may be held in rigid relationship to each other to form a seat by any well known and customary latching device, one of the most simple forms being a brace 21 shown in FIGURE 3 which is notched to receive an extension of the hinge 17. Obviously, the reversing and attaching mechanisms may be as complicated as desired such as, e.g., those shown in U.S. Patents 2,913,278, 2,926,949, 2,997,335 or other devices well known in the art.

Although the invention has been illustrated by means of a simple and inexpensive construction which would add little if any, to the customary cost of manufacturing a station wagon, the invention is obviously adapted to various station wagon constructions. For example, to aid in comfort and convenience to the passengers, it may be desirable to construct the convertible seat with a double pivot device which would enable the seat to be lowered in relationship to the plane of the rear deck. Also, various other features which lend comfort and convenience to the passengers may be added, e.g., arm rests, etc.

The cushions 18 and 19 may be made from any well known cushioning material but should be as thin as possible in order to take up as little space as possible in the luggage compartment when the lid is in closed position. Materials such as foamed polyurethanes, foamed rubbers, foamed resins such as poly vinyl chloride resins, cotton and felt batting, etc. may be utilized. Slabs of high density flexible polyurethane foam cushioning material ranging from about one to about three inches in thickness is unusually adapted to the practice of this invention.

Although the invention has been described in connection with station wagons, obviously it may be utilized in any structure where it is desired to have a lid which can be converted into a seat, e.g., panel trucks, house trailers, etc., and could even be used in regular passenger automobiles to provide decks for sleeping.

While certain representative embodiments and details have been shown for the purpose of illustrating the invention, it will be apparent to those skilled in this art that various changes and modifications may be made therein without departing from the spirit or scope of the invention.

I claim:

1. A vehicle of the station wagon type comprised of a body having a compartment located in the rear portion of said body, said compartment being closable by means of a lid, said lid being comprised of at least two sections, one section being hingedly attached to the said body and hingedly attached to another section and being adapted to form the base of a seat, and said other section being adapted to form the back of a seat, and means for holding said lid in seat forming position.

2. The vehicle of claim 1 wherein the said sections are covered on one side with a cushioning material.

3. The vehicle of claim 2 wherein the covering material is a polyurethane foam.

4. A vehicle of the station wagon type comprised of a body having a front seat and a second seat behind the front seat and having a compartment located in the rear portion of said body, said compartment containing a lid having two sections, one section being hingedly attached to the other of said two sections and to the body back of but near the said second seat, both of said sections having a cushioning material attached thereto, one of said sections being adapted to form the base of a seat, and the other section being adapted to form the back of a seat, and a latching device attached to said sections for holding said lid in seat forming position to form a rearwardly facing third seat.

References Cited in the file of this patent

UNITED STATES PATENTS

| | | |
|---|---|---|
| 1,067,008 | Draper | July 8, 1913 |
| 1,738,329 | Stacks | Dec. 3, 1929 |
| 2,888,296 | Huggins | May 26, 1959 |
| 3,008,755 | Hale | Nov. 14, 1961 |
| 3,121,585 | Krueger et al. | Feb. 18, 1964 |